UNITED STATES PATENT OFFICE.

LOUIS ANTOINE FERDINAND HAAS, OF PARIS, FRANCE, ASSIGNOR TO SOCIÉTÉ ANONYME L'AIRLIQUIDE, OF PARIS, FRANCE.

BLUE SULFUR DYE AND PROCESS OF MANUFACTURING SAME.

1,329,898.     Specification of Letters Patent.     Patented Feb. 3, 1920.

No Drawing.     Application filed August 5, 1918. Serial No. 248,479.

*To all whom it may concern:*

Be it known that I, LOUIS ANTOINE FERDINAND HAAS, of 48 Rue Saint-Lazare, Paris, France, engineer-chemist, have invented Blue Sulfur Dye and Processes of Manufacturing the Same, of which the following is a full, clear, and exact description.

When trichloronitrobenzene 1:2:4:5: is heated with anilin in the presence of sodium acetate, the corresponding dichloronitrodiphenylamin is obtained. This latter can be condensed with a molecule of nitrosophenol in the presence of sulfuric acid. A reddish product results therefrom which reducing agents transform into paroxyphenyl-p-o-diamino-4-5-dichlorodiphenylamin.

The present invention has for its object a process of treatment of this leuco base the result of which is to convert this latter into a navy blue coloring matter.

This process consists broadly in subjecting this leuco base to the action of sulfurizing agents such as sulfur and polysulfids alone or mixed with a solvent such as glycerin, bases, phenols, or the like.

The coloring matter obtained by the present process differs essentially from that derived from mono-chlorinated oxyphenyl diaminodiphenylamin which dyes vegetable fiber in a mediocre manner only and gives shades which are light blue and resist washing badly.

In order to make the invention more clearly understood there will be given, by way of example, a method of carrying out the present process:

An intimate mixture is made of 2 kgs. of paroxyphenyl-p-o-diamino-4:5-dichlorodiphenylamin and 1 kg. 800 of sulfur. The whole is brought to a temperature of about 200° C. As soon as the evolution of sulfureted hydrogen has ceased the mixture is allowed to cool down. The mass is then pulverized and dissolved in a solution containing 300 liters of water and 15 kgs. of crystallized sodium sulfid. Air is caused to bubble through this solution until complete precipitation of the coloring matter is produced. The latter is then filtered off, washed and dried. The product thus obtained is pulverulent, of a metallic appearance, possesses excellent tinctorial properties and has the property of dyeing vegetable fiber a dark navy blue in baths of sodium sulfid or of hydrosulfite.

It must be quite understood that the operation method just described is only given by way of indication and that the present process may be carried out by the use of all other sulfurizing bodies.

Claims—

1. A process of manufacture of a blue coloring matter which comprises heating at a reacting temperature paroxyphenyl-p-o-diamino-4:5-dichlorodiphenylamin with a sulfurizing agent.

2. A process of manufacture of a blue coloring matter which comprises heating at a reacting temperature paroxyphenyl-p-o-diamino-4:5-dichlorodiphenylamin with a sulfurizing agent mixed with a solvent.

3. A method of manufacture of a blue coloring matter consisting in mixing intimately paroxyphenyl-p-o-diamino-4:5 dichlorodiphenylamin with sulfur, heating this mixture to a temperature of about 200° C., letting the mixture cool down as soon as the evolution of sulfureted hydrogen has ceased, pulverizing the mass thus obtained and dissolving it in a solution of sodium sulfid, and causing air to bubble through this solution until the coloring matter is completely precipitated.

4. A blue sulfur dye derived from paroxyphenyl-p-o-diamino-4-5-dichlorodiphenylamin by reaction with a sulfurizing agent, and adapted to dye vegetable fiber navy blue in a bath of sodium sulfid as well as in a bath of hydrosulfite.

5. The process of manufacturing a blue sulfur dye which comprises intimately mixing paroxyphenyl-p-o-diamino-4:5-dichlorodiphenylamin with sulfur, and heating the mixture to a reacting temperature.

6. The process of manufacturing a blue sulfur dye which comprises intimately mixing paroxyphenyl-p-o-diamino-4:5-dichlorodiphenylamin with sulfur and an organic solvent, and heating the mixture to a reacting temperature.

The foregoing specification of my "blue coloring matter dyeing vegetable fiber and its process of manufacture", signed by me this thirteenth day of July 1918.

LOUIS ANTOINE FERDINAND HAAS.

Witnesses:
JOHN F. SIMONS,
FRANÇOIS WEBER.